United States Patent [19]

Taufer et al.

[11] Patent Number: 5,176,214
[45] Date of Patent: Jan. 5, 1993

[54] SAFETY SYSTEM FOR MOTOR-VEHICLE OCCUPANTS

[75] Inventors: Peter Taufer, Renningen, Fed. Rep. of Germany; Edmund Jeenicke, Sauvage Luxemburg, Knut Balzer, Ludwigburg-Pflugfelden, Fed. Rep. of Germany

[73] Assignee: Robert Bosch GmbH, Stuttgart, Fed. Rep. of Germany

[21] Appl. No.: 777,413

[22] PCT Filed: Jun. 20, 1990

[86] PCT No.: PCT/DE90/00466
§ 371 Date: Nov. 25, 1991
§ 102(e) Date: Nov. 25, 1991

[87] PCT Pub. No.: WO91/00813
PCT Pub. Date: Jan. 24, 1991

[30] Foreign Application Priority Data

Jul. 8, 1989 [DE] Fed. Rep. of Germany ....... 3922506

[51] Int. Cl.⁵ .............................................. B60R 21/32
[52] U.S. Cl. ..................................... 180/268; 280/735
[58] Field of Search ................ 180/268; 280/734, 735; 340/425.5, 438

[56] References Cited

U.S. PATENT DOCUMENTS

| | | | |
|---|---|---|---|
| 4,020,453 | 4/1977 | Spies et al. | 340/52 |
| 4,117,730 | 10/1978 | Spies et al. | 73/517 |
| 4,243,971 | 1/1981 | Suchowerskyj et al. | 340/52 |
| 4,701,628 | 10/1987 | Kumasaka et al. | 280/735 |
| 4,740,741 | 4/1988 | Andres et al. | 280/735 |
| 4,804,859 | 2/1989 | Swart | 280/735 |
| 4,851,705 | 7/1989 | Musser et al. | 280/735 |

FOREIGN PATENT DOCUMENTS 3001780 7/1981 Fed. Rep. of Germany .
3816591 11/1989 Fed. Rep. of Germany .

Primary Examiner—Kenneth R. Rice
Attorney, Agent, or Firm—Kenyon & Kenyon

[57] ABSTRACT

The invention relates to a safety system for motor-vehicle occupants, in particular a restraint system, such as an airbag, belt tighteners, etc., which has at least one tripping sensor that exhibits a response time, one processing unit, and one final firing stage for activating the safety system. To protect against spurious tripping, an inhibiting circuit (21) is proposed, which is triggered by the processing unit (2). It cancels an interlock of the final firing stage (5) only after an interlocking enable time ($t_v$) has elapsed, whereby the interlocking enable time ($t_v$) is shorter than the response time ($t_a$) of the tripping sensor (1).

22 Claims, 2 Drawing Sheets

SAFETY SYSTEM FOR MOTOR-VEHICLE OCCUPANTS

FIELD OF THE INVENTION

The present invention relates to a safety system for motor-vehicle occupants, in particular a restraint system, such as an airbag, belt tighteners, etc.

BACKGROUND INFORMATION

It is becoming more and more common for motor vehicles, particularly for private automobiles, to come equipped with passenger safety systems. These safety systems offer passengers protection from injury in case of collision or the like. Here, above all, the airbag system comes to mind. In these types of systems, instances of false tripping must be avoided at all costs, since very dangerous situations can result. When an airbag is released unintentionally, not only is the driver of the car robbed of his vision for a certain period of time, but he can also be startled—among other reasons because of the accompanying noise that is generated—, so that his ability to react is lost for a short time, or at the least is limited. Also, once an airbag has been released, it cannot be used again. It is a costly procedure to reinstall the system.

Two important criteria, which can lead to spurious tripping in the mentioned electronic restraint systems, are undefined hardware states during the time that a tripping sensor, for example, is brought in and out of circuit, as well as malfunctions or failures in a processing unit, whose task it is to trigger a final firing stage of the safety system. When the tripping sensor is brought in and out of circuit, the requisite supply voltage runs through the entire voltage range. As a result, states can arise in which, for example, the integrated circuits of the tripping sensor do not have any defined function, so that a spurious tripping can occur. The mentioned malfunctions or failures of the processing unit likewise lead to undefined states, so that the final firing state of the safety system can be triggered unintentionally.

SUMMARY OF THE INVENTION

The safety system for motor-vehicle occupants according to the present invention has the advantage that, as a result of an inhibiting circuit triggered by the processing unit, the final firing stage is interlocked, so that a spurious tripping is avoided. The inhibiting circuit cancels an interlock of the final firing stage only after a specifiable interlocking enable time has elapsed, whereby the interlocking enable time is shorter than the tripping sensor's response time. The electronic tripping sensor detects specific driving-condition variables and, when specifiable criteria are fulfilled, it initiates the releasing of the passenger safety system. The tripping sensor can detect the motor vehicle's acceleration, for example, and process it in one or more digital or analog computing circuits; more particularly it can undertake an integration. If a specific variable is exceeded thereby, then the releasing follows. It is therefore apparent that because of the integrating process, the system is not released immediately, but rather only after the mentioned response time. To provide a reliable protective function, that is the protective function of activating the passenger safety system before acceleration values occur which could lead to passenger injury, the interlocking enable time must not exceed a specific time span. In particular, it is necessary for the tripping pulse which comes from the tripping sensor to be fed to the unlocked final firing stage so that the system can be activated. Consequently, the interlocking enable time according to the invention must have already elapsed by this instant. This makes it possible, however, to analyze the existing state of the safety system with regard to its correct operating state. In particular, one can test if the electronic sub-assemblies of the tripping sensor and of the processing unit are each in the correct state, so that the desired defined function is available in each case. Thus, in normal operation, the final firing stage is constantly interlocked because of the inhibiting circuit. This interlocking is only canceled early enough, when the passenger safety system is supposed to be released intentionally at a specific instant, so that the time delay (interlocking enable time) has elapsed by the time of the actual firing instant. If a malfunction occurs in the processing unit—as mentioned—during normal operation, which would lead to an unacceptable triggering of the final firing stage, then as a result of the time-delayed enabling according to the invention, a "rescue intervention" is still possible for a certain amount of time. The way this can take place, for example, is that another undisturbed processing unit (preferably a microcomputer) recognizes the malfunction of the mistakenly stimulated processing unit and, in a timely fashion within the interlocking enable time, prevents the passenger safety system from being released by shifting the entire system into the reset state.

The interlocking enable time is preferably longer than the time interval of a monitoring circuit. The monitoring circuit can be comprised in particular of another processing unit and/or of a watchdog-circuit window or the like. In the case of a watchdog-circuit window, for example, it is provided that its monitoring time interval is shorter than the interlocking enable time, whereby the watchdog-circuit window directly interlocks the final firing stage and keeps it interlocked for a blocking period.

A further development of the invention provides for an undervoltage recognition circuit. It works already at a fraction of the safety system's rated supply voltage and interlocks the final firing stage until the supply voltage exceeds a threshold that guarantees the operativeness of the entire circuit arrangement. On the basis of the inhibiting circuit according to the invention, disturbances in the voltage supply, which can lead to undefined states of the processing unit, do not lead to an unwanted release of the safety system. The undervoltage recognition circuit prevents undefined states that occur in the integrated circuit as a result of the increase or decrease in the supply voltage from causing the safety system to be tripped, particularly when the system is switched on and off as well. This is achieved by means of the mentioned interlocking of the final firing stage, which is only canceled when the supply voltage is greater than the specifiable threshold.

It can also be provided that the undervoltage recognition circuit maintains the interlocking of the final firing stage until a specifiable blocking period has elapsed, whereby the blocking period starts at the instant the threshold is crossed. Therefore, after an adequate voltage potential is restored, this blocking period assures that a period of time is available in which the operating state can be checked. If undefined states or functions are detected, they cannot cause a spurious tripping of the safety system, because the final firing stage is interlocked.

After the blocking period has elapsed, it is advantageous for the processing unit to take over the interlocking of the final firing stage that had been realized by the inhibiting circuit. When the supply voltage is in an undervoltage phase, the undervoltage recognition circuit assures that the final firing stage is interlocked. This also applies—because of the blocking period—for a certain time span after an adequate voltage potential has been restored. The interlocking of the final firing stage is subsequently assumed by the processing unit in conjunction with the inhibiting circuit according to the invention, so that an interlocking of the final firing stage is always guaranteed and a spurious tripping is effectively countered. The interlocking of the final firing stage is only canceled when the safety system is released intentionally. All the while, the time condition according to the invention is adhered to, so that up until this instant, considerable reliability is given in view of a spurious tripping.

According to a further development of the invention, the processing unit features a blocking connection which triggers the inhibiting circuit. The processing unit also has a reset input. When a reset pulse is applied to this reset input, the processing unit shifts the blocking connection into its interlocking state, so that it is not possible for the final firing stages to respond.

It can be provided, in particular, for the blocking connection to be connected to an interrupt connection of the processing unit. A test routine can be immediately started by triggering the interrupt connection, provided that the blocking connection assumes a state which results in the cancellation of the interlocking of the final firing stage. The test routine reveals if there was justification for the releasing of the interlocking of the final firing stage. For example, a specific test program can be started or a branch can be made to a specific program position by way of the interrupt connection, through which means the mentioned test is initiated.

According to a further development of the invention, the output of the undervoltage recognition circuit is connected to the reset input of the processing unit. This guarantees that no spurious tripping takes place in cases where disturbances exist due to an undervoltage state.

A watchdog-circuit window, which is triggered by the processing unit in specific time intervals, is advantageous. This watchdog-circuit window is linked to the reset input of the processing unit. Provided that the processing unit undertakes a triggering of the watchdog-circuit window within the timing-window sequence, the transmission of a reset pulse is suppressed. If there is a lapse in the trigger pulses, for example because the program run gets "hung up", or if trigger pulses appear which lie outside of the timing window, then the watchdog-circuit window delivers a reset pulse to the reset input of the processing unit, through which means a resetting takes place. As a result, the final firing stage is shifted to its interlocking state. Moreover, a direct interlocking of the final firing stages is also provided to cover potential defects in the reset branch.

The inhibiting circuit preferably features a comparator, whose one first input is connected to a reference voltage and whose other second input is connected via an interconnection point to the blocking connection. Furthermore, a time-constant circuit fed by the supply voltage is connected to the interconnection point. This time-constant circuit consists of an RC element, whose resistor is connected between the one pole of the supply voltage and the interconnection point, and whose capacitor is connected between the other pole of the supply voltage and the interconnection point. The output of the comparator is connected up to an interlocking circuit that triggers the final stage. The capacitor C of the RC element is charged by the supply voltage via the resistor R. In case of a reset pulse at the reset input of the processing unit or during normal operation (when there is no triggering of the safety system), the blocking connection of the processing unit is connected to a potential (preferably ground), at which the capacitor discharges at least to the point where its voltage becomes less than the reference voltage. As a result, the comparator switches to a state which brings about an interlocking of the final firing stage. The output of the comparator can only switch over to a state, which brings about a cancellation of the interlocking of the final firing stage, when the capacitor connected up to its second input is charged by the supply voltage via the resistor of the RC element to a potential that is greater than the reference voltage that is applied to its first input. Thus, the switch-over time is able to be established by means of the time constant of the RC element. This switch-over time corresponds to the interlocking enable time according to the invention, since when the comparator is switched over, the voltage level then applied to its output brings about an interlock deactivation of the final firing stage.

The comparator is connected via an interlocking circuit to the final firing stage. The interlocking circuit preferably features a controllable lock-out circuit element, which can be triggered both by a switching device controlled by the magnitude of the supply voltage as well as by the comparator. When the supply voltage is brought into circuit, the switching device is connected through already at a low voltage, which makes up only a fraction of the rated supply voltage. Through this means, the controllable lock-out circuit element of the interlocking circuit is shifted into a state which blocks the final firing stage. Thus a blocking that prevents spurious tripping already exists before the supply voltage goes up to a value, which permits the remaining components of the safety system to function. If the undervoltage recognition circuit establishes that the supply voltage is at an adequate level, then after the blocking period elapses, a power-on reset is transmitted to the reset input of the processing unit. At the same time, the switching element is switched over in such a way that the circuit state of the lock-out circuit element, which brings about the interlocking of the final firing stage, would be canceled at this point, provided that an appropriate signal is made available at the output of the comparator as well. However, the latter is not the case since the reset pulse at the reset input of the processing unit leads to such a state at the blocking connection of the processing unit that the voltage of the capacitor of the RC element is less than the reference voltage. Therefore, at its output, the comparator assumes a state which triggers the lock-out circuit element in a way that interlocks the final firing stage. Only after a time span that is dependent on the time constant of the RC element and that begins after the appearance of the reset pulse, does the comparator switch over in a way that deactivates the interlocking of the final firing stage. The switchover operation is effected as a result of the charging of the capacitor, for as soon as this capacitor exceeds the potential specified by the reference voltage, the comparator assumes its other corresponding circuit state. However, according to another exemplified embodiment of the invention, it is entirely possible that a potential is specified at the blocking connection of the processing unit in the normal operation of the safety system, whereby this potential always causes the comparator to be triggered so that the final firing stage is interlocked. As already described, this interlocking is only canceled if there is an intentional releasing, that is the tripping sensor responds after the interlocking enable time according to the invention is canceled. In this case, a test is performed during the interlocking enable time according to the invention to check if the participating system components are in their correct state.

DETAILED DESCRIPTION

Figure 1:
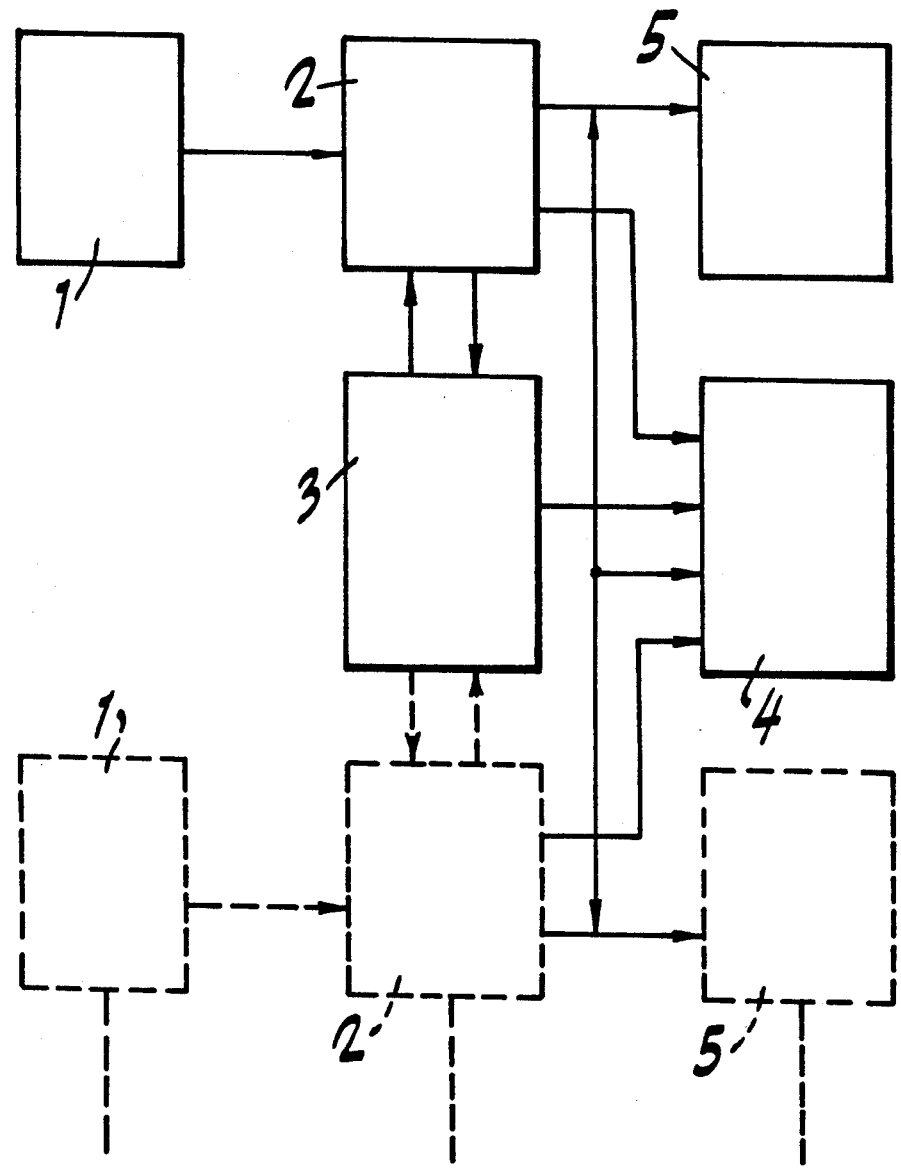
FIG. 1 is a block diagram of a passenger safety system according to the present invention.

Referring to FIG. 1, the safety system for motor-vehicle occupants according to the present invention has a tripping sensor 1, which is linked to a processing unit 2. The processing unit 2 is connected to an undervoltage recognition circuit 3. In addition, an inhibiting circuit 4 is provided, which is connected up to a final firing stage 5. The final firing stage 5 serves to release the passenger safety system, which is conceived as an airbag, for example. Accordingly, the final firing stage 5 triggers an ignition tablet of a propellant charge for the airbag. In accordance with the design of the passenger safety system, it is entirely possible for several tripping sensors, processing units, final firing stages etc. to be provided. This is indicated in the dotted-line representation in FIG. 1.

Figure 2:
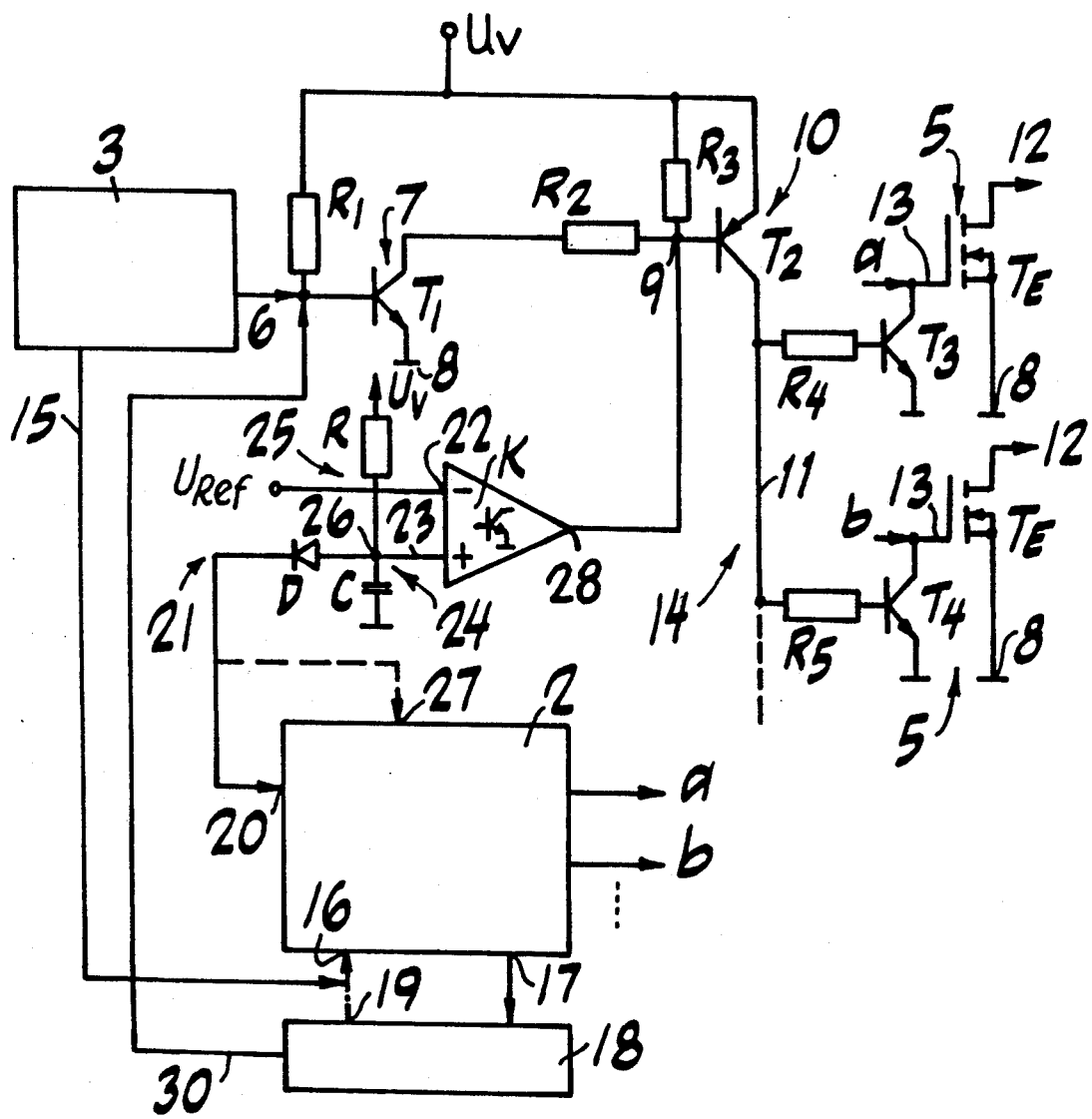
FIG. 2 is a detailed representation of the arrangement according to FIG. 1.

FIG. 2 shows that the undervoltage-supply circuit 3 has an output 6 which triggers a switching element 7. The switching element 7 is conceived as a transistor $T_1$. The base of the transistor $T_1$ is connected via a resistor $R_1$ to the positive pole of a supply voltage $U_V$. The emitter of the transistor $T_1$ is connected to the other pole of the supply voltage $U_V$ which is comprised of the ground 8.

An interconnection point 9 is connected to the collector of the transistor $T_1$ via a resistor $R_2$. Furthermore, an additional resistor $R_3$ is connected between the interconnection point 9 and the positive pole of the supply voltage $U_V$. The interconnection point 9 is also connected to the gate electrode of a controllable lock-out circuit element 10, which is conceived as a transistor $T_2$. The gate electrode is comprised of the base of transistor $T_2$. The emitter of the transistor $T_2$ is connected up to the positive pole of the supply voltage $U_V$, while its collector leads to a distribution line 11.

Two final firing stages 5 which feature power transistors $T_E$ are depicted in FIG. 2. The contact-break distances of the power transistors $T_5$ are connected with one connecting terminal to ground 8 and with the other connecting terminal 12 to ignition tablets (not shown) of the airbag system. The gate electrodes 13 are connected to trigger outputs a or b of the processing unit 2. Furthermore, the gate electrodes 13 are connected to the collectors of the transistors $T_3$ and $T_4$, whose emitters are connected to ground 8. The respective bases of transistors $T_3$ and $T_4$ are connected via resistors $R_4$ or $R_5$ to the distributor line 11. The transistors $T_2$, $T_3$ and $T_4$ belong—with their protective circuit elements—to an interlocking circuit 14.

An output 15 of the undervoltage recognition circuit 3 leads to a reset input 16 of the processing unit 2. This processing unit 2 has an output 17, which leads to a watchdog-circuit window 18. The reset input 16 of the processing unit 2 is connected to one output 19 of the watchdog-circuit window 18. Another output 30 of the watchdog-circuit window 18 leads to the base of the transistor $T_1$.

Furthermore, the processing unit 2 features a blocking connection 20, which has an inhibiting circuit 21 linked up to it. This inhibiting circuit 21 features a comparator K, whose one first input 22 is connected to a reference voltage $U_{Ref}$ and whose other second input 23 leads to a time-constant circuit 24. The time-constant circuit 24 is made up of an RC element 25, which has a resistor R and a capacitor C. The resistor R is connected with its one terminal connection to the positive pole of the supply voltage $U_V$ and with its other terminal connection to an interconnection point 26. The one terminal connection of the capacitor C is also connected to this interconnection point 26. The other terminal connection of the capacitor C is connected to ground 8. Furthermore, a diode D is connected by its anode to the interconnection point 26. The cathode of the diode D leads to the blocking connection 20. Furthermore, the blocking connection 20 can be connected to an interrupt connection 27. This interrupt connection 27 is indicated with a dotted line in FIG. 2. The output 28 of the comparator K is connected to the interconnection point 9. The passenger safety system according to the invention functions as follows:

When the supply voltage $U_V$ is brought into circuit, the transistor $T_1$ is switched through already at a very low voltage level ($U_V < 1V$). Via its collector and the resistor $R_2$, the transistor $T_1$ triggers the base of the transistor $T_2$ in such a way that this transistor $T_2$ also assumes its conductive state. This leads to the triggering of transistors $T_3$ and $T_4$, etc., (additional transistors which are connected to the connecting line 11 can also be provided, which trigger corresponding final firing stages 5). As a result of the triggering, transistors $T_3$ and $T_4$ are shifted into their conductive states, so that the gate electrodes 13 of the power transistors $T_E$ take on zero potential. This causes a blocking of the power transistors; the final firing stages 5 are consequently interlocked, so that the passenger safety system cannot be activated. Therefore, provided that undefined states in the components (for example in their integrated circuits) occur after the supply voltage $U_V$ is brought into circuit and after the accompanying voltage rise, so that false pulses appear at the trigger outputs a, b, which lead to a triggering of the gate electrodes 13 of the power transistors $T_E$, which releases the passenger safety system, no effect is achieved because of the protection according to the invention, since the trigger pulses are shunted off via the conductive transistors $T_3$, $T_4$ to ground.

If the undervoltage recognition circuit 3 senses an undervoltage, then a static reset state prevails. If there is an adequate amount of supply voltage $U_V$, then after a specifiable threshold is exceeded during a blocking period, a power-on reset pulse is started by a timing circuit After the blocking period $t_s$ elapses, the sustained reset, which for so long had effected an interlocking of the final firing stage, is taken away. At the same time, the base of the transistor $T_1$ is triggered via the output 6 of the undervoltage recognition circuit 3 to such an extent that this transistor $T_1$ assumes its blocked state. As a consequence, the transistors $T_3$ and $T_4$ would also be shifted by means of the transistor $T_2$ into their blocking states. However, this is prevented—as clarified in greater detail in the following—due to the potential, which is applied to the output 28 of the comparator K and is supplied to the interconnection point 9.

The blocking connection 20 of the processing unit 2 is also actuated because of the power-on reset pulse at the reset input 16. The blocking connection 20 takes on zero potential. Since the capacitor C of the time-constant circuit 24 is charged via the resistor R by the supply voltage $U_V$—depending on the time constant—to a specific value, the capacitor C is rapidly discharged by means of the diode D, because the blocking connection 20 is "switched to ground", so that the potential at the second input 23 of the comparator K is less than the potential specified by the reference voltage $U_{Ref}$ at the first input 22. By this means, the comparator K is switched through; that is its output 28 is connected to ground 8. Consequently—as indicated already above—the transistor $T_2$ remains in its conductive state, although the transistor $T_1$ had been transferred to its blocking state. The result is that the blocking of the power transistors $T_E$ remains intact. After being discharged, as described, the capacitor C is once more charged via the resistor R, so that the potential at the second input of the comparator K rises slowly. After the power-on reset pulse dies down, the blocking connection 20 assumes its "HIGH" state, so that the diode D is blocked and the capacitor C is prevented from discharging. As soon as the potential at the second input 23 becomes greater than the reference voltage $U_{Ref}$ of the first input 22, the comparator K switches over in a way that causes the transistor $T_2$, which is triggered by it, to shift to its blocking state. Consequently, the transistors $T_3$ and $T_4$ are also transferred to their blocking states, so that the gate electrodes 13 of the power transistors $T_E$ are no longer connected to ground 8. Now, if the final firing stages 5 are triggered via the trigger outputs a, b of the processing unit 2, the passenger safety system is released. Therefore, the time starting with the recharging of the capacitor C, as previously described, until the moment when the comparator K switches over, represents an interlocking enable time $t_v$ according to the invention, which gives rise to a blocking of the final firing stages 5. The time constant of the RC element 25, which determines the interlocking enable time $t_v$ is selected according to the invention to be shorter than a response time $t_a$ of the tripping sensor 1. According to the exemplified embodiment described here, the tripping sensor 1 or the tripping sensors 1 (several of these types of sensors can also be provided in one system) detects the acceleration of the corresponding motor vehicle. This acceleration is then processed in one or more digital or analog processing units (not shown). For example, if an integrated acceleration value of an adequate magnitude exists, then the tripping criterion for the passenger safety system is fulfilled. The result is a triggering via the trigger outputs a, b of the processing unit. The evaluation process of the tripping sensor 1 (for example the mentioned integration of the acceleration) entails a response time $t_a$, which according to the invention must be greater than the previously mentioned interlocking enable time $t_v$. Only in this manner, is it guaranteed that the blocking of the final firing stages 5 is canceled at the tripping instant by means of the transistors $T_3$ and $T_4$. According to the invention, the components of the passenger safety system are tested during the interlocking enable time $t_v$ to ascertain if a spurious tripping would be caused due to a malfunction (for example as a result of an undefined state of an integrated circuit). Thus, due to the interlocking enable time $t_v$ according to the invention, a rescue intervention is still possible for a certain amount of time as a result of the time-delayed enabling. If a component of the system (preferably a microcomputer), for example, recognizes the malfunction of the mistakenly stimulated processing unit 2, then a tripping action can be prevented in time (within the interlocking enable time $t_v$), in that the entire system is shifted into a reset state.

To test for correct functioning, the safety system also has a watchdog-circuit window 18. This watchdog-circuit window must preferably be triggered periodically at very definite intervals (timing window), so that no reset pulse appears at its output 19. The triggering action is carried out by the processing unit 2 and only follows, as per instructions, when a correct program run is available. This means that malfunctions, which result in trigger pulses failing to appear or which result in the emission of trigger pulses which lie outside of the timing window, lead to a reset pulse of the watchdog-circuit window 18. This reset pulse is applied to the reset input 16, so that the final firing stages 5 are blocked, as was already explained above for the case when the supply voltage $U_V$ is brought into circuit.

According to one variant, the processing unit 2 can feature an interrupt connection 27, which is connected to the blocking connection 20. In this manner, a releasing of the final-stage interlocking can be transmitted directly to the interrupt connection 27. To accomplish this, the blocking connection assumes a "HIGH" state, through which means a test routine is started. The test routine reveals if the releasing of the final-stage interlocking was justified. It is provided, in particular, that triggering the interrupt connection 27 causes a specific program position to be triggered, so that the mentioned test can take place.

Thus the design according to the invention prevents spurious tripping caused by undefined hardware states during the time that the supply voltage is brought in and out of circuit, as well as malfunctions or failures in one or more processing units. For the closing or opening operation, a blocking is initially foreseen on the basis of the existing low voltage, which remains intact until the supply voltage exceeds a specifiable threshold. All the same, even after this threshold is exceeded, the final firing stage 5 is still not enabled, because the blocking period $t_s$ must first have elapsed. This is an additional security measure. But even after the blocking period $t_s$ has elapsed, the final firing stage 5 is not enabled, because the inhibiting circuit 4 according to the invention first initiates its activity. The interlocking enable time $t_v$, which continues to elapse until the final firing stages 5 are released, is used to detect unacceptable operating states or malfunctions and possibly to prevent a tripping of the safety system in spite of (unacceptably) existing trigger signals at the trigger outputs a, b.

The invention, however, is not only limited to the operating phase during the time that the supply voltage $U_V$ is brought in and out of circuit, but also a final-stage interlocking can always be provided during normal operation. This is achieved in that, after the execution of the closing operation at the blocking connection 20, the "low" state is retained, so that the comparator K brings about the blocking state of the interlocking circuit 14. Should the normal operation be abandoned (for example, due to a tripping as the result of a crash, a final-stage test cycle or the like), then the interlocking must be released by all accessing elements. This must be done early enough, so that at the firing point, the time delay until the interlock deactivation has elapsed, whereby this delay exists because of the interlocking enable time $t_v$ according to the invention. By the time the response time $t_a$ of tripping sensor 1 expires, the final stages 5 for firing the safety system must have been enabled. During the time that the interlocking enable time $t_v$ elapses, the test is carried out, as described, to check for malfunctions which could cause a spurious tripping.

Concerning the described watchdog-circuit window 18, it should also be noted that it is more likely for a system reset to be initiated due to trigger pulses that fail to appear or due to trigger pulses that are not situated in the timing windows than it is for the interlocking enable time $t_v$ to expire. Thus, a spurious tripping of the safety system can be prevented in time.

If a malfunction or an error occurs in the processing unit 2, for example, then while the interlocking enable time $t_v$ according to the invention elapses, it is possible to have a configuration which will bring about the correct state. Thus, faulty states existing at the trigger outputs a, b are rectified in time, so that a spurious tripping is avoided.

In particular, by combining the above described individual security measures, it is possible in the case of a passenger safety system to reliably monitor nearly all occurring and conceivable operating states and to prevent spurious tripping.

We claim:

1. A safety system for controlling a motor-vehicle restraint system, comprising:
   at least one tripping sensor which exhibits a response time;
   at least one processing unit coupled to the tripping sensor;
   at least one final firing stage for activating the restraint system; and
   an inhibiting circuit controllable by the processing unit, wherein the inhibiting circuit cancels an interlock of the final firing stage only after an interlocking enable time has elapsed, the interlocking enable time being shorter than the response time of the tripping sensor.

2. The safety system according to claim 1, wherein the interlocking enable time is longer than a time interval of a monitoring circuit.

3. The safety system according to claim 1, further comprising an undervoltage recognition circuit which works at a fraction of the safety system's rated supply voltage and interlocks the final firing stage until a supply voltage exceeds a threshold that guarantees the operativeness of the entire circuit arrangement.

4. The safety system according to claim 3, wherein the undervoltage recognition circuit maintains the interlocking of the final firing state until a blocking period has elapsed following the instant that the threshold is exceeded.

5. The safety system according to claim 4, wherein after the blocking period has elapsed, the processing unit takes over the interlocking of the final firing stage that had been realized by the inhibiting circuit.

6. The safety system according to claim 5, wherein the processing unit includes a blocking connection which controls the inhibiting circuit.

7. The safety system according to claim 6, wherein the processing unit has a reset input, and when a reset pulse is applied to the reset input, the processing unit shifts the blocking connection into an interlocking state.

8. The safety system according to claim 6, wherein the blocking connection is coupled to an interrupt connection of the processing unit.

9. The safety system according to claim 7, wherein an output of the undervoltage recognition circuit is coupled to the reset input.

10. The safety system according to claim 7, further comprising a watchdog-circuit window, which is triggered by the processing unit and is coupled to the reset input.

11. The safety system according to claim 10, wherein the watchdog-circuit window includes an output which blocks the final firing stage when the trigger window is not observed and only releases the final firing stage again after the blocking period has expired.

12. The safety system according to claim 6, wherein the inhibiting circuit includes a comparator whose first input is coupled to a reference voltage and whose second input is coupled via an interconnection point to the blocking connection, and a time-constant circuit fed by the supply voltage is coupled to the interconnection point.

13. The safety system according to claim 12, wherein the time-constant circuit includes an RC element, whose resistor is coupled between a first pole of the supply voltage and the interconnection point, and whose capacitor is coupled between a second pole of the supply voltage and the interconnection point.

14. The safety system according to claim 12, wherein an output of the comparator is coupled to an interlocking circuit that triggers the final firing state.

15. The safety system according to claim 14, wherein the interlocking circuit includes a controllable lock-out circuit element, which is triggered by a switching device, which is controlled by the supply voltage and by the comparator.

16. A system for controlling a restraint device in a motor vehicle, comprising:
   a firing stage for activating the restraint device;
   a sensor having a response time;
   means for interlocking the firing state to prevent an activation of the restraint device;
   an inhibiting circuit for canceling an interlock of the firing stage within a predetermined period of time shorter than the response time of the sensor; and
   a processing unit coupled to an output of the sensor for controlling the inhibiting circuit and triggering the firing stage.

17. The system according to claim 16, further comprising a monitoring circuit coupled to the processing unit.

18. The system according to claim 17, further comprising an undervoltage recognition circuit for interlocking the firing stage until a supply voltage exceeds a threshold.

19. The system according to claim 18, wherein the undervoltage recognition circuit maintains the interlocking of the firing stage until a blocking period has expired after the threshold is exceeded.

20. The system according to claim 19, wherein the processing unit interlocks the firing stage after the blocking period has expired.

21. The system according to claim 20, wherein the processing unit includes a blocking connection for controlling the inhibiting circuit.

22. The system according to claim 21, wherein the processing unit includes a reset input coupled to an output of the undervoltage recognition circuit.

* * * * *

UNITED STATES PATENT AND TRADEMARK OFFICE
CERTIFICATE OF CORRECTION

PATENT NO. : 5,176,214

DATED : January 5, 1993

INVENTOR(S) : Taufer et al.

It is certified that error appears in the above-indentified patent and that said Letters Patent is hereby corrected as shown below:

Column 3      line 51, change "watc-" to --watch- --;
line 52, change hdog-circuit" to --dog-circuit--;

Column 5      line 60, change "$T_5$" to --$T_E$--;

Column 6      line 66, change "circuit" to --circuit.--;

Column 7      line 23, delete "aho-"
line 24, change "ve" to --above--.

Signed and Sealed this

Twenty-fourth Day of May, 1994

Attest:

BRUCE LEHMAN

*Attesting Officer*      *Commissioner of Patents and Trademarks*